US009391911B1

(12) United States Patent
Anderson et al.

(10) Patent No.: US 9,391,911 B1
(45) Date of Patent: Jul. 12, 2016

(54) CONGESTION WINDOW MODIFICATION

(75) Inventors: Glen Anderson, Palo Alto, CA (US); Sivasankar Radhakrishnan, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 13/184,375

(22) Filed: Jul. 15, 2011

(51) Int. Cl.
*H04L 12/807* (2013.01)
*H04L 1/16* (2006.01)
*H04L 12/801* (2013.01)
*H04L 29/06* (2006.01)

(52) U.S. Cl.
CPC ............. *H04L 47/27* (2013.01); *H04L 1/1621* (2013.01); *H04L 1/1628* (2013.01); *H04L 1/1635* (2013.01); *H04L 1/1671* (2013.01); *H04L 47/29* (2013.01); *H04L 69/163* (2013.01)

(58) Field of Classification Search
None
See application file for complete search history.

(56) References Cited

U.S. PATENT DOCUMENTS

| 6,614,755 | B1 * | 9/2003 | Dote ............................. 370/230 |
| 6,625,118 | B1 * | 9/2003 | Hadi Salim et al. .......... 370/229 |
| 6,721,800 | B1 | 4/2004 | Basso et al. |
| 6,757,248 | B1 * | 6/2004 | Li ........................ H04L 1/1858 370/235 |
| 6,757,255 | B1 * | 6/2004 | Aoki ....................... H04L 1/187 370/229 |
| 6,987,735 | B2 | 1/2006 | Basso et al. |
| 2005/0286416 | A1 * | 12/2005 | Shimonishi et al. .......... 370/229 |
| 2006/0218264 | A1 * | 9/2006 | Ogawa et al. ................. 709/223 |
| 2007/0121511 | A1 * | 5/2007 | Morandin ...................... 370/235 |
| 2007/0133418 | A1 * | 6/2007 | Agarwal ....................... 370/236 |
| 2010/0070824 | A1 * | 3/2010 | Ramakrishnan ...... H04L 1/1614 714/752 |
| 2011/0002224 | A1 * | 1/2011 | Tamura ......................... 370/236 |
| 2011/0249553 | A1 * | 10/2011 | Wang et al. .................... 370/230 |

OTHER PUBLICATIONS

Alizadeh, et al., "DCTP: Efficient Packet Transport for the Commoditized Data Center; http://research.microsoft.com/pubs/121386/dctop-public.pdf", (2010), 15 pages.
Allman, "TCP Congestion Control; RFC 2581; http://www.ietf.org/rfc/rfc2581.txt; Apr. 1999", (Apr. 1999), 13 pages.
Ramakrishnan, et al., "The Addition of Explicit Congestion Notification (ECN) to IP; http://www.faqs.org/rfcs/rfc3168.html; Sep. 2001", (Sep. 2001), 57 pages.

* cited by examiner

*Primary Examiner* — Joshua A Kading
(74) *Attorney, Agent, or Firm* — John D. Lanza; Foley & Lardner LLP (57) ABSTRACT

Techniques and mechanisms for evaluating a transmission outcome indicium to determine a state of data traffic congestion in a network. In an embodiment, congestion information for a packet of a transmission group is evaluated at a computer device to determine a congestion state, where a size of the transmission group is determined based on a congestion window parameter. In another embodiment, the evaluation to determine the congestion state is performed prior to the computer device detecting a transmission outcome indicium for some other packet of the transmission group.

22 Claims, 7 Drawing Sheets

CONGESTION WINDOW MODIFICATION

BACKGROUND

1. Technical Field

This disclosure relates generally to network communication. More particularly, certain embodiments are directed to techniques for determining a state of data traffic congestion in a network.

2. Background Art

Data centers and other types of networks continue to trend toward increasingly large scale, complexity and speed. Accordingly, operation of such networks increasingly depends upon individual network agents exhibiting "neighborly" behavior in the use of network resources. For overall network efficiency, it is desirable that individual network agents be aggressive enough in utilizing network resources that they achieve their own ends, while at the same time sufficiently limiting their respective use of network resources as an accommodation for one another's respective ends.

In aid of overall network efficiency, network devices may implement one or more congestion detection mechanism. One type of congestion detection mechanism is delay sensing. In delay sensing, packets are sent from a sending device to a destination device, where the packets received are then acknowledged back to the sender. The sender may then estimate network congestion based on the delay in getting back acknowledgements for packets sent.

Another congestion detection mechanism is congestion notification, such as the explicit congestion notification (ECN) RFC 3168 (2001) extension to the Internet Protocol (IP) and to the Transmission Control Protocol (TCP). In ECN, packets are sent to a destination network device by a source network device, where one or more confirmations of successful packet transmission are sent back to the source network device. The expected time between a source device sending a packet to a time of the source device receiving a corresponding confirmation of packet transmission is referred to as a round-trip time (RTT). In ECN, a confirmation of a packet's successful transmission may include information which explicitly specifies that data traffic congestion was experienced as that packet was being sent in the network.

Current ECN techniques variously send a group of packets and await one or more acknowledgment messages for all packets of the group. Subsequently, these ECN techniques variously determine from the received acknowledge messages a size of a next group of packets to send on the network. As the size, speed and complexity of networks continues to grow, such networks become increasingly sensitive to the effects of network data traffic congestion.

BRIEF DESCRIPTION OF THE DRAWINGS

Various embodiments are illustrated by way of example, and not by way of limitation, in the figures of the accompanying drawings in which.

DETAILED DESCRIPTION

As described herein, embodiments variously provide mechanisms for evaluating a data traffic congestion state in a network. In an embodiment, a computer platform transmits packets in a network where, for example, there is a risk of data traffic congestion resulting from transmission of one or more of the packets. To provide for congestion mitigation, the computer platform may send multiple packets as a transmission group—e.g. where a size of the transmission group is determined based on a congestion window ("cwnd") parameter. A congestion mitigation measure—for example, changing a value of the cwnd parameter to determine a subsequent transmission group—may be based on a result of a transmission for an earlier transmission group.

By way of illustration and not limitation, transmission of a packet in a transmission group may lead to a transmission outcome. A transmission outcome may include, for example, a successful receipt of the packet—e.g. receipt by an intended destination network node and/or by some intermediary network node. Alternatively or in addition, a transmission outcome may include data traffic congestion, which is at least partially caused by the packet being sent on the network. Alternatively or in addition, a transmission outcome may include a packet being dropped (e.g. intentionally or unintentionally) during the course of the packet being sent through the network.

A source agent of the computer platform may determine, or otherwise detect, an indication of a transmission outcome, referred to herein as a transmission outcome indicium. A single transmission outcome indicium may, for example, correspond to only a single packet of a transmission group. Another transmission outcome indicium may indicate that the same transmission outcome applies to multiple packets of a transmission group.

A transmission outcome indicium may, for example, include an acknowledgment (ACK) message received by the computer platform that indicates successful packet transmission. Alternatively or in addition, a transmission outcome indicium may include a message received by the computer platform that specifies that a packet has been dropped. Alternatively or in addition, a transmission outcome indicium may include a signal—e.g. generated within the source computer device—that some test condition has been met (e.g. some threshold timeout period is exceeded), indicating that no acknowledge message is to be expected for a given packet.

In an embodiment, a transmission outcome indicium may include congestion information specifying whether (or not) a particular packet or packets is associated with some data traffic congestion. Such congestion information may, for example, be included in an acknowledgement (ACK) message or other message provided to the computer platform by the network in response to transmission of the particular packet or packets. By way of illustration and not limitation, the computer platform may receive a message which includes one or more flags—e.g. in a TCP header according Explicit Congestion Notification, RFC 3168 (2001)—to indicate a congestion event. Any of a variety of additional or alternative techniques for communicating such congestion information to the computer platform may be used.

With one or more transmission outcome indicia associated with one or more packets of the transmission group, the source agent of the computer platform may perform an evaluation to determine a congestion state of the network—e.g. the presence or the absence of some level of data traffic congestion.

By way of illustration and not limitation, such evaluation may include identifying a number of packets that, up to a particular point in time, have been identified as being associated with some traffic congestion. Such a number of packets may be evaluated, for example, relative to (e.g. as a percentage or other fraction of) a number of packets of the transmission group for which, up to the point in time, some transmission outcome indicia has been detected. Alternatively or in addition, such a number of packets may be evaluated relative to a total number of packets in the transmission group. Any of a variety of other techniques for such evaluation may also be used, according to various embodiments.

In an embodiment, evaluation of a transmission outcome indicium to determine a congestion state may include comparing to some threshold value a number of packets that, up to a particular point in time, have been identified as being associated with some traffic congestion. By way of illustration and not limitation, a 50% level—e.g. eight (8) packets out of a sixteen (16) packet transmission group—may be a threshold at which, and/or above which, congestion mitigation measures may be deemed to be warranted. Alternatively or in addition, a rate of change of such a number of packets may be compared to some threshold value. Any of a variety of other threshold tests may also be used to determine a congestion state, according to various embodiments.

The source agent of the computer platform may, for example, evaluate a transmission outcome indicium associated with one packet of a transmission group prior to the source agent detecting any transmission outcome indicium associated with some other packet of that same transmission group. By way of illustration and not limitation, congestion information associated with one packet of the transmission group may be evaluated prior to the source agent—or more generally, the computer platform—either detecting congestion information (or other acknowledge information) for some second packet of the transmission group, or detecting some indication that such information for the second packet is not to be expected any longer.

In an embodiment, the source agent may perform successive evaluations to detect for congestion state, the successive evaluations performed over a period of time throughout which transmission outcome indicia associated with a transmission group is being detected by the source agent. For example, the source agent may perform a first evaluation of some or all of the transmission outcome indicia for the transmission group that has been detected up to a first period of time associated with the first evaluation. Subsequently, the source agent may perform a second evaluation of indicia received since the first period of time—e.g. by evaluating some or all of the transmission outcome indicia for the transmission group which has been detected up to a second period of time.

In an embodiment, a determined congestion state may be a basis for signaling a congestion mitigation measure. A congestion mitigation measure may include, for example, changing a packet transmission rate for sending packets from the computer device. Alternatively or in addition, a congestion mitigation measure may include changing a value of a cwnd parameter. For example, where a size of a first transmission group is previously specified based on a cwnd parameter having a first value, the determined congestion state may indicate a need to change the cwnd parameter to a second value—e.g. for determining a size of a second transmission group. Any of a variety of additional or alternative congestion mitigation measures may be implemented, according to various embodiments.

The changing of a cwnd parameter may, in certain embodiments, be according to any of a variety of techniques. For example, a cwnd value may be changed according to one or more of a Binary Increase Congestion (BIC) control algorithm, a CUBIC control algorithm, additive-increase/multiplicative-decrease (AIMD), multiplicative-increase/additive-decrease (MIAD), multiplicative-increase/multiplicative-decrease (MIMD), additive-increase/additive-decrease (AIAD) and/or the like.

Evaluation of a transmission outcome indicium for a first packet of a first transmission group may indicate that a cwnd parameter is to have a first value for determining a size of a second transmission group to be transmitted. Subsequently, evaluation of another transmission outcome indicium for a second packet of the same first transmission group may indicate that the cwnd parameter is be modified from the first value to a second value—e.g. for determining a revised size of the second transmission group. In an embodiment, revising the size of the second transmission group may take place after sending of packets of the second transmission group has begun, but before all packets of the second transmission group have been sent from the computer platform.

Figure 1:
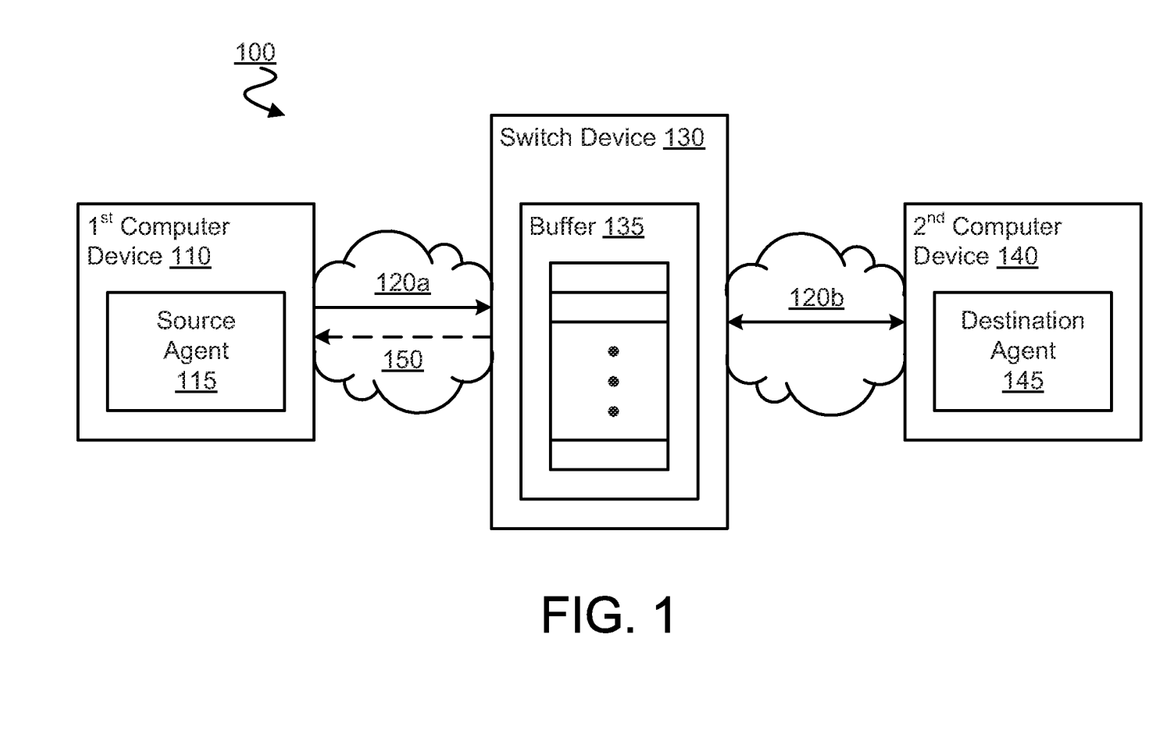
FIG. 1 is a block diagram illustrating example elements of a network for detecting data traffic congestion according to an embodiment.

FIG. 1 shows example elements of a network 100 for exchanging data traffic congestion information according to an embodiment. Network 100 may include any of a variety of combinations of one or more constituent networks including, but not limited to, a local area network (LAN), wide area network (WAN), wired network, wireless network, Internet, satellite network and the like. Network 100 may include a first computer device 110 having a source agent 115 (e.g. hardware, firmware and/or executing software) to evaluate information—referred to herein as congestion information—that indicates congestion in network data traffic.

In an embodiment, first computer device 110 includes any of a variety of data processing-capable hardware including, but not limited to a desktop, laptop, tablet or other handheld computer, smart phone, server, etc. For example, first computer device 110 may include a card device, such as a blade server or rack server.

Operation of first computer device 110 may include transmitting packets on network 100. Such packets may, in an embodiment, include serial transmission and/or parallel transmission of packets which are part of a transmission group, where a size of the transmission group—e.g. as a total number of packets—may be determined based on a cwnd parameter. By way of illustration and not limitation, a cwnd parameter may specify a number of packets, or other information—such as a length of transmission time and/or a transmission rate—from which such a number of packets may be determined.

In an embodiment, the size of the transmission group may be equal to cwnd. In another embodiment, the size of the transmission group may be equal to some value such as min (cwnd, rwnd), where min is a function to provide the minimum of those parameters that are passed into said function, and rwnd is a receive window parameter—e.g. a threshold number of packets asserted by some network device other than first computer device 110. By way of illustration and not limitation, cwnd may be 60 packets in one scenario, while a rwnd of 50 packets may be asserted by another device with this first computer device 110 is to communicate. In such a scenario, min(cwnd, rwnd) may be evaluated as 50 packets—i.e. the minimum value of 60 packets and 50 packets.

Transmission of a packet of a transmission group may result in a transmission outcome, as discussed above. After it has begun sending packets of a transmission group, source agent 115 may detect for an indicium of one or more transmission outcomes for such packets of the transmission group.

A transmission outcome indicium may include, for example, an acknowledge message (ACK) provided from another device of network 100 in response to a successful delivery of a packet. Alternatively or in addition, a transmission outcome indicium may include a dropped packet message provided from another device of network 100 in response to a detected failure of a network packet to be delivered. Alternatively or in addition, a transmission outcome indicium may include signal indicting an exceeding of some test condition, signifying that no such acknowledge message—and/or that no such dropped packet message—is to be expected. For example, source agent 115 may detect an indication that some timeout period has been exceeded without any first computer device 110 having received any message indicating either the success or failure of a delivery of a particular packet.

In an embodiment, a transmission outcome indicium may include congestion information—e.g. received in an ACK message—specifying whether (or not) a packet was determined to be associated with data traffic congestion. In certain embodiments, an indicium that a packet is lost or dropped—e.g. an indication that no acknowledge message is to be expected—may itself constitute an indication of network congestion.

For the purpose of illustrating features of certain embodiments, exchange 120a is shown as part of a transmission of packets to a second device 140 via an intermediary device—represented by an illustrative switch device 130. Exchange 120a may include some or all of the packets of a transmission group. Any of a variety of additional or alternative destination and/or intermediary devices may communicate with first computer device 110, according to various embodiments.

In an embodiment, either or both of switch device 130 and second computer device 140 may implement mechanisms—e.g. ECN, quantized congestion notification (QCN), and/or other such mechanisms—to provide congestion information associated with those packets of exchange 120a which belong to the transmission group.

For example, switch device 130 may include hardware, firmware and/or executing software (not shown) to determine that one or more of packets in exchange 120a has caused a data traffic congestion event. In an embodiment, switch 130 may detect that the one or more packets have caused a usage level for one or more resources—e.g. a buffer 135 of switch device 130—to exceed some threshold value. Switch device 130 may provide congestion information in response to detecting such data traffic congestion. By way of illustration and not limitation, switch device 130 may modify a packet from exchange 120a to include information indicating that data traffic congestion has been associated with the transmission of that packet. The congestion information may then be sent in an exchange 120a of the packet from the switch device 130 to second computer device 140.

In an embodiment, second computer device 140 includes a destination agent 145 having hardware, firmware and/or executing software to identify and/or generate congestion information based on one or more packets received in exchange 120b. By way of illustration and not limitation, second computer device 140 may return an acknowledge message 150 to first computer 110. Such an acknowledge message 150 may be exchanged via switch device 130, although certain embodiments are not limited in this regard. Such an acknowledge message may be returned, for example, according to data structures for ECN or other such standards for congestion notification.

In an alternative embodiment, switch device 130 may directly send congestion information back to first computer device 110—e.g. independent of second computer device 140. Certain embodiments are not limited with regard to how a destination device or intermediary device may communicate congestion information to first computer device 110 in response to detecting a congestion event.

In an embodiment, source agent 115 may detect a first transmission outcome indicium for a first packet of a transmission group, which includes the first packet and a second packet. In response to the detecting, source agent may perform an evaluation of the first transmission outcome indicium—e.g. congestion information such as that received in an acknowledge message—to determine a congestion state of network 100. Evaluation of the first transmission outcome indicium may take place before source agent 115 detects—e.g. before first computer device 110 receives or otherwise determines—a transmission outcome indicium for the second packet of the transmission group.

Figure 2A:
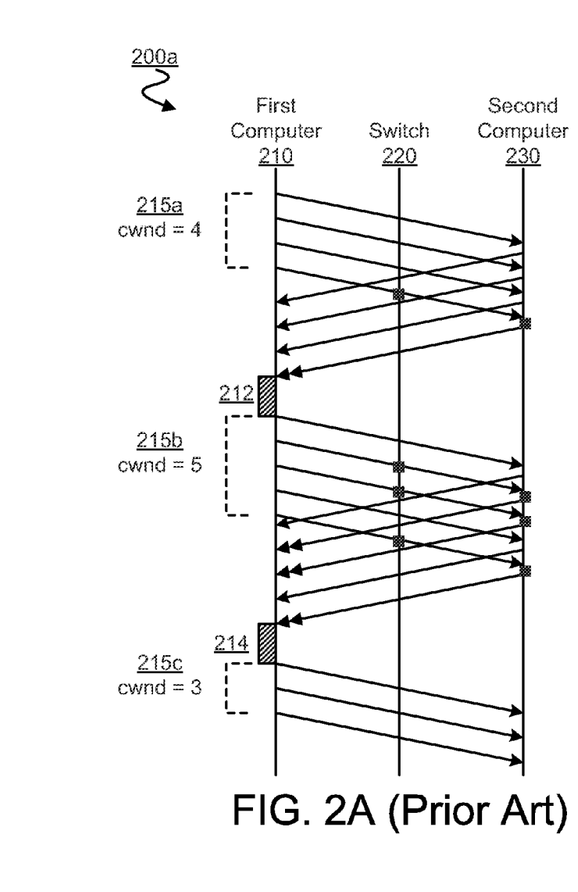
FIG. 2A is a swim lane diagram showing an example communication exchange for implementing congestion notification.

FIG. 2A shows a network exchange 200a for implementing congestion notification according to a known technique. In exchange 200a, first computer 210 sends packets of a first transmission group 215a to a second computer 230 via a switch 220, where a size of first transmission group 215a is determined based on a cwnd parameter being set to a particular value. To illustrate a simple example, first transmission group 215a is shown as including four packets based on cwnd having a value of four (4).

Switch device 220 detects that congestion is associated with particular ones of the packets of first transmission group 215a. For example, switch device 220 may detect that the fourth packet of first transmission group 215a has contributed to a threshold level of resource usage being exceeded. By way of illustration and not limitation, a switch chip may have a set of resources including packet buffer memory comprising, for example, 16000 cells of 128-byte memory. Congestion may be indicated, in this illustrative scenario, when use of those cells by one port exceeds a threshold level—e.g. 50 KB. In an embodiment, congestion notification may be based on a threshold level or resource usage which has been marked in a probabilistic manner—e.g. as a fraction of buffer usage between two usage levels. A threshold buffer or other resource usage level may, for example, represent a piecewise linear or other curve (user-defined, empirically determined, modeled, etc.) varying with a probability of a packet being dropped. In response to such detecting, switch device 220 provides to second computer device 230 congestion information—e.g. added to that fourth packet—to indicate the detected congestion.

In response to receiving the packets of first transmission group 215a, second computer device 230 provides one or more acknowledge messages to first computer 210—e.g. via switch 220. One acknowledge message includes an indication of the congestion which was associated with the fourth packet of first transmission group 215a First computer 210 performs an evaluation 212 of congestion information associated with first transmission group 215a after all packets of first transmission group 215a have been acknowledged. The evaluation 212 is to determine a congestion state of the network. However, according to conventional congestion notification techniques, first computer 210 does not begin its evaluation 212 based on first transmission group 215a until each packet of the transmission group 215a is accounted for. For example, no congestion information associated with first transmission group 215a is evaluated to determine a congestion state until all packets of first transmission group 215a have been acknowledged.

First computer 210 implements a first congestion response based on a result of evaluation 212. For example, first computer 210 may determine that a level of congestion is sufficiently low to allow a second transmission group 215b to be sent according to a larger value of cwnd. To illustrate a simple example, second transmission group 215b is shown as including five packets based on cwnd having a value of five (5).

Switch 220 subsequently detects congestion associated with certain ones of the packets of second transmission group 215b—e.g. the second, third and fifth packets. Switch 220 modifies packets of second transmission group 215b to indicate to second computer 230 the congestion associated with the second, third and fifth packets. In response, second computer 230 may include congestion information in one or more acknowledge messages associated with those second, third and fifth packets of second transmission group 215b.

After all packets of second transmission group 215b have been acknowledged, first computer 210 performs an evaluation 214 of the congestion information associated with second transmission group 215b. However, according to known congestion notification techniques, first computer 210 does not begin its evaluation based on second transmission group 215b until each packet of second transmission group 215b is accounted for. For example, no congestion information associated with second transmission group 215b is evaluated until all packets of second transmission group 215b have been acknowledged.

First computer 210 may implement a second congestion response based on a result of evaluation 214. For example, first computer 210 may determine that a level of congestion is sufficiently high to require that a third transmission group 215c is sent according to a smaller value of cwnd. For example, the third transmission group 215c is shown as including three packets based on cwnd having a value of three (3). Thereafter, one or more additional evaluations, and transmissions according to successively updated cwnd parameter values, may be performed by first computer 210.

Figure 2B:
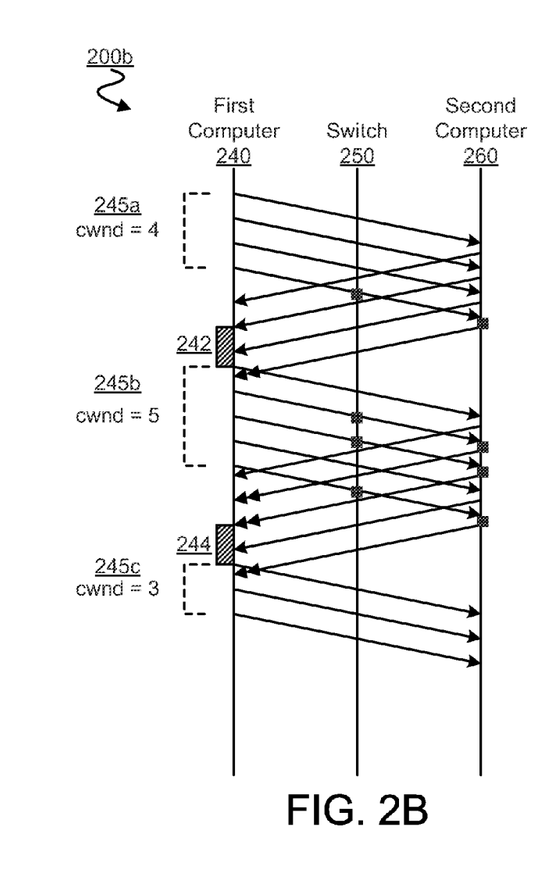
FIG. 2B is a block diagram illustrating example elements of a communication exchange to implement a determining of a congestion state according to an embodiment.

FIG. 2B shows example elements of a network exchange 200b for implementing congestion notification according to an embodiment. In exchange 200b, first computer 240 may send packets of a first transmission group 245a to a second computer 260—e.g. via a switch 250. In an embodiment, first computer 240, switch 250 and second computer 260 each include some or all of the respective features of first computer device 110, switch device 130 and second computer device 140.

A size of first transmission group 245a may be determined based on a cwnd parameter being set to a particular value. To contrast features of certain embodiments from exchange 200a, first transmission group 245a is also shown as including four packets based on cwnd having a value of four (4). Features of the illustrative exchange 200b may be extended to apply to any of a variety of additional or alternative types of transmission groups that are determined based on various congestion window parameter values.

Switch device 250 may detect that congestion is associated with particular ones of the packets of first transmission group 245a. For example, switch device 250 may detect that a fourth packet of first transmission group 245a has contributed to a threshold level of resource usage being exceeded. In response to such detecting, switch device 250 may provide second computer device 260 with congestion information—e.g. added to that fourth packet—which indicates the detected congestion.

First computer 240 may perform an evaluation 242 based on a transmission outcome indicium for a packet of first transmission group 245a. By way of illustration and not limitation, in response to receiving the packets of first transmission group 245a, second computer device 260 may provide one or more acknowledge messages to first computer 240— e.g. via switch 250. One or more of the acknowledgment messages may include congestion information that indicates that no congestion is associated with certain ones of the packets of first transmission group 245a. By contrast, one such acknowledge message may include an indication of the congestion which was associated with the fourth packet of first transmission group 245a.

In an embodiment, a transmission outcome indicium may include a signal generated at, or otherwise detected by, first computer 240, the signal indicating that some test condition has been met (e.g. some threshold timeout period is exceeded) to signifying that no acknowledge message is to be expected for a given packet.

In an embodiment, first computer 240 performs evaluation 242 based on a transmission outcome indicium for a first packet of first transmission group 245a, but prior to detecting any transmission outcome indicium for some second packet of first transmission group 245a. For example, evaluation 242 may be performed prior to first computer 240 receiving all acknowledge messages associated with first transmission group 245a.

First computer 240 may implement a first congestion response based on a result of evaluation 242. For example, first computer 240 may determine that a level of congestion is sufficiently low to allow a second transmission group 245b to be sent according to a larger value of cwnd. To illustrate a simple example, second transmission group 245b is shown as including five packets based on cwnd having a value of five (5).

Switch 250 may detect congestion associated with certain ones of the packets of second transmission group 245b—e.g. the second, third and fifth packets. Switch 250 may indicate to second computer 260 the congestion associated with the second, third and fifth packets of second transmission group 245b. In response, second computer 260 may include congestion information in one or more acknowledge messages associated with those second, third and fifth packets of second transmission group 245b. One or more of the acknowledgment messages may include congestion information that indicates that no congestion is associated with certain ones of the packets of second transmission group 245b. By contrast, one or more acknowledge messages may include an indication of the congestion that was associated with some or all of the second, third and fifth packets of second transmission group 245b.

In an embodiment, first computer 240 may perform an evaluation 244 based on an indicia of a transmission outcome for a first packet of second transmission group 245b, but prior to detecting any indicia of a transmission outcome for some second packet of second transmission group 245b. For example, evaluation 244 may be performed prior to first computer 240 receiving all acknowledge messages associated with second transmission group 245b.

First computer 240 may implement a second congestion response based on a result of evaluation 244. First computer 240 may determine that a level of congestion is sufficiently high to require that a third transmission group 245c is sent according to a smaller value of cwnd. For example, the third transmission group 245c is shown as including three packets based on cwnd having a value of three (3). Thereafter, additional evaluations and transmissions according to successively updated cwnd parameter values may be performed by first computer 240.

The illustrative exchange 200b shows various evaluations of congestion information provided in acknowledge messages for packets of a transmission group. However, congestion information received in the acknowledgment message is just one example of a transmission outcome indicium. Accordingly, features of exchange 200b may be extended to apply more generally to other transmission outcome indicia. More particularly, first computer 240 may additionally or alternatively evaluate another transmission outcome indicia—e.g. a message specifying that a packet has been dropped or a signal indicating that no acknowledge message for the packet is to be expected—prior to first computer 240 detecting a transmission outcome indicium for some other packet of the same transmission group.

Figure 3:
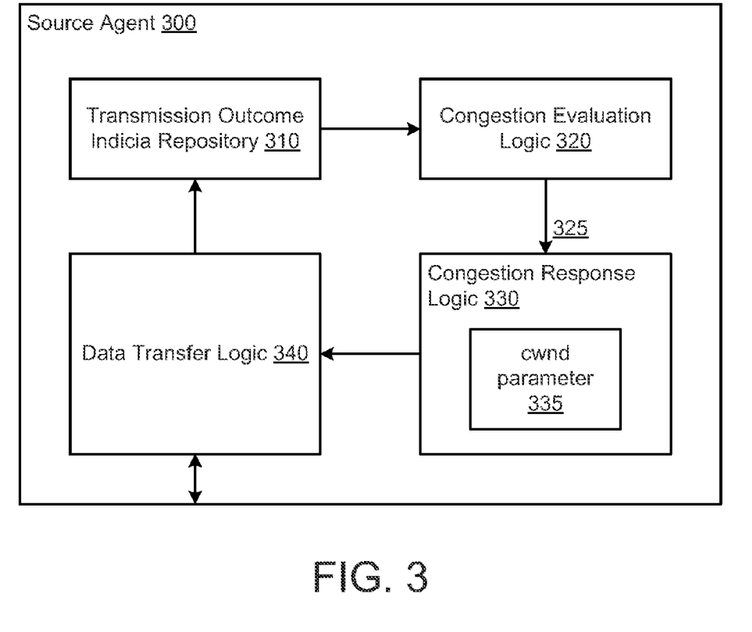
FIG. 3 is a block diagram illustrating example elements of a source agent for evaluating a data traffic congestion state according to an embodiment.

FIG. 3 shows example elements of a source agent 300 for evaluating a congestion state according to an embodiment. Source agent 300 may include some or all of the features of source agent 115, for example.

In an embodiment, source agent 300 includes congestion evaluation logic 320—e.g. any of a variety of combinations of hardware, firmware and/or executing software to evaluate, as described herein, a transmission outcome indicium for a packet of a transmission group. The transmission group may, for example, be sized based on a cwnd parameter.

For example, a source agent 300 may include, or otherwise have access to, a transmission outcome indicia repository 310—e.g. any of a variety of combinations of volatile data storage media and/or non-volatile data storage media to store at least one transmission outcome indicium.

By way of illustration and not limitation, transmission outcome indicia repository 310 may store, for example, congestion information which has been provided in an acknowledge message indicating completion of a transmission of a packet of the transmission group. Alternatively of in addition, transmission outcome indicia repository 310 may store data from a network message specifying that a packet of the transmission group was dropped. Alternatively or in addition, transmission outcome indicia repository 310 may store a result of a test operation which indicates that no acknowledge message—and/or that no dropped packet message—for a particular packet or packets of the transmission group is to be expected.

Congestion evaluation logic 320 may perform an evaluation of a transmission outcome indicium. In an embodiment, evaluating a transmission outcome indicium for one packet of the transmission group may be performed prior to source agent 300 detecting any transmission outcome indicium for another packet of the transmission group.

Congestion evaluation logic 320 may, for example, evaluate a total set of transmission outcome indicia which has been received up to a point in time for packets of a particular transmission group.

By way of illustration and not limitation, congestion evaluation logic 320 may identify a number of received transmission outcome indicia, a rate of change of such a number, and/or the like. In an embodiment, the identified number of received transmission outcome indicia, rate of change thereof, and/or the like may variously compared to one or more threshold values indicating one or more congestion states. In certain embodiments, such threshold values may be set according to known congestion mitigation techniques. Such techniques may include, for example, performing system simulation and/or running small-scale system tests.

Based on the evaluation of a transmission outcome indicium, congestion evaluation logic 320 may provide to congestion response logic 330 of source agent 300 a signal 325 indicating the presence (or absence) of a congestion state. In another embodiment, congestion response logic 330 is external to source agent 300—e.g. implemented by logic of first computer device 110 that is external to source agent 115.

Congestion response logic 330 may include any of a variety of combinations of hardware, firmware and/or executing software to implement a congestion mitigation measure based on signal 325. By way of illustration and not limitation, congestion response logic 330 may respond to signal 325 by changing a value of the cwnd parameter 335 that was a basis for determining a size of the transmission group. Although the evaluating which results in signal 325 may be distinguished from conventional evaluation techniques, a changing of the value of the cwnd parameter may, in certain embodiments, be according to any of a variety of known techniques for varying the size of transmission groups. By way of illustration and not limitation, cwnd parameter 335 may be varied according to one or more of BIC, CUBIC, AIMD, MIAD, MIMID, AIAD and/or the like. Certain embodiments are not limited with respect to the technique for changing a value for cwnd 335 based on signal 325.

Congestion response logic 330 may communicate to data transfer logic 340 of source agent 300 information indicating how a next transmission group is to be transmitted in a network. Data transmission logic 340 may include, for example, a TCP stack. In an alternate embodiment, data transfer logic 340 is external to, and in communication with, source agent 300. Data transfer logic 340 may transmit packets—e.g. of a subsequent transmission group—based on the information from congestion response logic 330 indicating, for example, the changed value of cwnd parameter 335.

Figure 4:
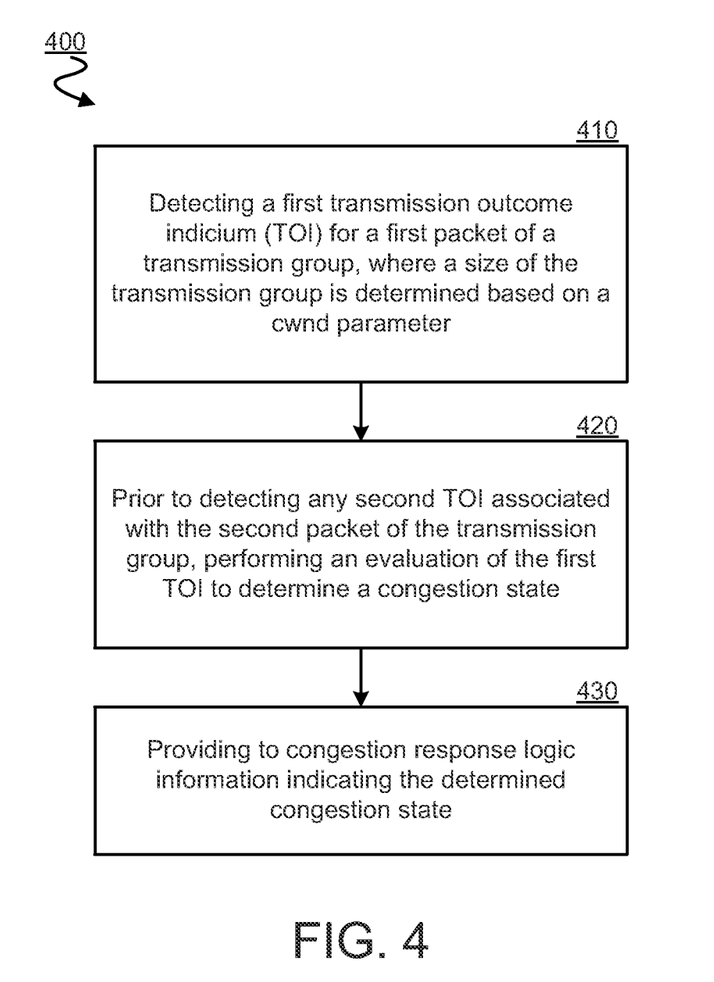
FIG. 4 is a flow diagram illustrating example elements of a method for evaluating a data traffic congestion state according to an embodiment.

FIG. 4 shows example elements of a method 400 for determining a congestion state in a network according to an embodiment. Method 400 may be performed, for example, by one or more computer devices having some or all of the features of first computer device 110. By way of illustration and not limitation, an agent such as source agent 115 may perform method 400.

In an embodiment, method 400 includes, at 410, detecting a first transmission outcome indicium for a first packet of a transmission group, where a size of the transmission group is determined based on a cwnd parameter. In an embodiment, the first transmission outcome indicium includes congestion information specifying whether the first packet has been identified as being associated with a congestion event in a network. The congestion information may, for example, be received by the computer device from the network in an acknowledge message indicating successful transmission of one or more packets of the transmission group.

The cwnd parameter may define or otherwise indicate a number of packets to be included in the transmission group. For example the cwnd parameter may indicate some threshold number of transmitted packets which may be pending in the network—e.g. sent out on the network and without a transmission outcome yet determined—at a given time.

Based on the detecting 410, method 400 may, at 420, perform an evaluation of the first transmission outcome indicium to determine a congestion state, the evaluation prior to detecting any second transmission outcome indicium associated with the second packet of the transmission group. In an embodiment, the transmission outcome indicium for the second packet may include a congestion information from an acknowledge message, a message specifying that the second packet has been dropped, a timeout signal indicating that no acknowledge message for the second packet is to be expected, or the like.

Evaluating the first transmission outcome indicium may include, for example, identifying a total number of packets of the transmission group which, up to a particular point in time, have been identified as being associated (or correspondingly, as not being associated) with some data traffic congestion. By way of illustration and not limitation, the first transmission outcome indicium may be evaluated based on a threshold number of packets of the transmission group which have been identified as being associated with data traffic congestion.

After determining the congestion state, method 400 may, at 430, provide to congestion response logic information indicating the determined congestion state. Such information may, for example, identify that a certain percentage (e.g. 50%) or other fraction of packets in the transmission group have been determined to be congested.

In an embodiment, method 400 may further perform a congestion mitigation measure (not shown) based on the information indicating the determined congestion state. Such a congestion mitigation measure may, for example, include changing the congestion window parameter from the first value to a second value. In an embodiment, a sending of packets of a second transmission group may be subsequently initiated based on the congestion window parameter having the second value. The initiating packet transmissions for a second transmission group may, for example, be prior to detection—e.g. by the source agent, or more generally, the computer device—of respective transmission outcome indicia for each packet of the transmission group.

In certain embodiments, method 400 may further perform additional transmission outcome evaluations and/or congestion mitigation operations (not shown). By way of illustration and not limitation, the source agent may detect and evaluate a transmission outcome indicium associated with the second packet of the transmission group, the evaluating to determine a second congestion state. Based on the determining of such a second congestion state, the source agent may generate a signal indicating that the congestion window parameter is to be changed from the second value to a third value. In an embodiment, after the initiating the sending of packets of the second transmission group, the sending of packets of the second transmission group may be modified based on the congestion window parameter having the third value.

Figure 5:
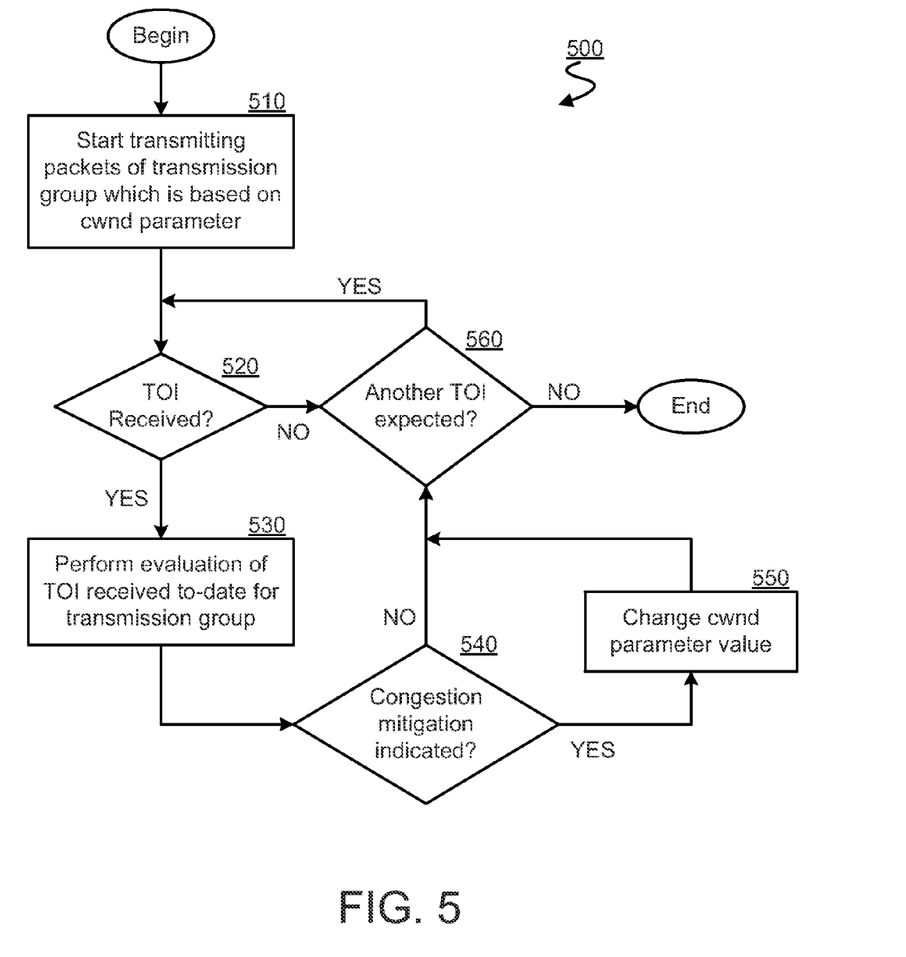
FIG. 5 is a flow diagram illustrating example elements of a method for evaluating a data traffic congestion state according to an embodiment.

FIG. 5 shows example elements of a method 500 for determining a congestion state in a network according to an embodiment. Method 500 may be performed, for example, by one or more computer devices having some or all of the features of first computer device 110. By way of illustration and not limitation, an agent such as source agent 115 may perform method 500.

Method 500 may include, at 510, starting transmitting packets of a transmission group that is based on a cwnd parameter. In an embodiment, a size of the transmission group may be determined based on the cwnd parameter having a particular value.

Method 500 may subsequently test, at 520, to detect for a transmission outcome indicium (TOI) of any packet of the transmission group that may be newly received. If no new TOI is received for the transmission group, method 500 may, at 560, test to see is a TOI for any other packet of the transmission group is to be expected. If another such TOI is expected, then the method 500 may return to the test operation at 530. Otherwise, the method 500 may end—e.g. at least for evaluating a congestion state associated with the transmission group.

If a TOI is detected at 520 as newly received, method 500 may, at 530, perform an evaluation of one or more such TOIs for the transmission group which have been newly received "to-date"—e.g. since any last evaluation of a TOI for the transmission group. Based on a signal or other result generated by the evaluation at 530, another test may be performed, at 540, to determine whether any congestion mitigation is indicated.

If the test at 540 indicates that a congestion mitigation measure is to be implemented, method 500 may, at 550 change the value of the cwnd parameter. Additional or alternative congestion mitigation operations may be performed, according to various embodiments. After adjusting the cwnd parameter value at 550, method 500 may perform the test operation 560.

In certain embodiments, method 500 may include additional operations (not shown). By way of illustration and not limitation, after the cwnd parameter value is changed at 560, the computer device may initiate transmission of packets in a second transmission group—e.g. where a size of the second transmission group is determined based on the changed cwnd parameter value. In an embodiment, transmission of packets in the second transmission group may be performed before respective TOIs are detected for all packets of the earlier transmission group.

Moreover, after transmission of packets in the second transmission group has begun, method 500 may continue to test for any outstanding TOIs associated with the earlier transmission group. Such continued testing may, for example, lead to determining a need for another change to the cwnd parameter value. In an embodiment, transmission of packets in the second transmission group may be modified according to this additional change to the parameter value.

Figure 6:
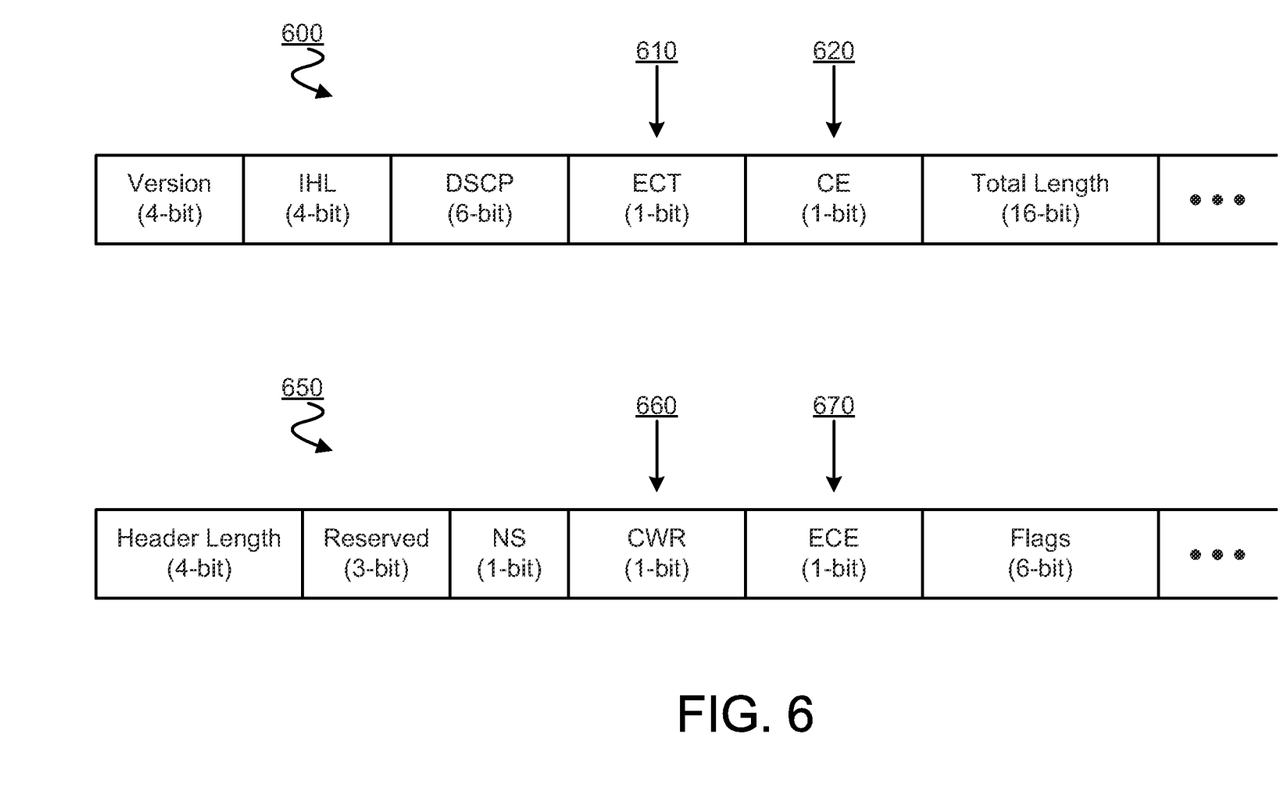
FIG. 6 is a block diagram illustrating example information exchanged to implement a determining of a data traffic congestion state according to an embodiment.

FIG. 6 shows information that may be communicated to allow an evaluation of data traffic congestion according to an embodiment. Such information may be variously exchanged, for example, between first computer device 110 and one or more other devices of network 100. By way of illustration and not limitation, a data packet 600 may be sent from a computer device as one of multiple data packets in a transmission group, where a size of the transmission group is defined based on a cwnd parameter.

Example elements of an IP header of data packet 600 are shown to illustrate one example of mechanisms for providing back to the computer device congestion information associated with data packet 600. Any of a variety of additional or alternative mechanisms may be implemented to provide such congestion information.

In an embodiment, data packet 600 includes an ECN-Capable Transport (ECT) bit 610 and a Congestion Experienced (CE) bit 620. According to a conventional ECN protocol, information may be communicated via the ECT bit 610 and the CE bit 620 according to the following:

| ECT Bit | CE Bit | Combination Indicates |
|---------|--------|----------------------|
| 0 | 0 | An endpoint of the transport protocol is not ECN-capable |

| ECT Bit | CE Bit | Combination Indicates |
|---|---|---|
| 0 | 1 | Endpoints of the transport protocol are ECN-capable |
| 1 | 0 | Endpoints of the transport protocol are ECN-capable |
| 1 | 1 | Congestion has been experienced |

In an embodiment, an intermediary device—e.g. switch device 130 or some router or other network device—between the sending device and an endpoint device may receive data packet 600. Depending on traffic conditions, the intermediate device may modify the ECT bit 610 and/or the CE bit 620 to indicate that data packet 600 has been identified as contributing to some threshold level of data traffic congestion. The modified data packet 600 may then be sent on toward an intended endpoint device.

For context, ECT bit 610 and CE bit 620 are shown in relation to other elements of an IP header—e.g. a 4-bit version field, a 4-bit Internet Header Length (IHL) field, a 6-bit Differentiated Services Code Point (DSCP) field, and a 16-bit total length field. However, such other elements of data packet 600 are merely illustrative, and are not limiting on certain embodiments.

In an embodiment, a device receiving data packet 600 may detect from the ECT bit 610 and CE bit 620 that the received data packet 600 has been identified as contributing to congestion in a switch or other network device. Accordingly, ECT bit 610 and CE bit 620 may be evaluated—e.g. in combination with corresponding bits in one or more other packets of the same transmission group—to determine whether there are a sufficient percentage (e.g. 50%) of packets of the transmission group associated with traffic congestion to warrant congestion mitigation.

To acknowledge successful receipt of the received packet back to the source computer, a destination device may send an acknowledge packet 650. For the purpose of illustrating an example of features according to one embodiment, the acknowledge packet 650 is shown as including some elements of a TCP header.

In the TCP header, acknowledge packet 650 may include an ECN-Echo (ECE) bit 670. The destination device may use this bit to indicate back to the source device that one or more received packets—for which acknowledge packet 650 is an acknowledgement—have been identified as contributing to a congestion event. Acknowledge packet 650 may also include a Congestion Window Reduced (CWR) bit 660, which a network device can set to indicate reduction of a congestion window parameter—e.g. in response to the source computer device detecting that ECE flag 670 has been detected in acknowledge packet 650.

For context, CWR bit 660 and ECE bit 670 are shown in relation to other elements of a TCP header—e.g. a 4-bit header length field, a 3-bit reserved field, a nonce sum (NS) bit, and a 6-bit flag field. However, such other elements of data packet 650 are merely illustrative, and are not limiting on certain embodiments.

Figure 7:
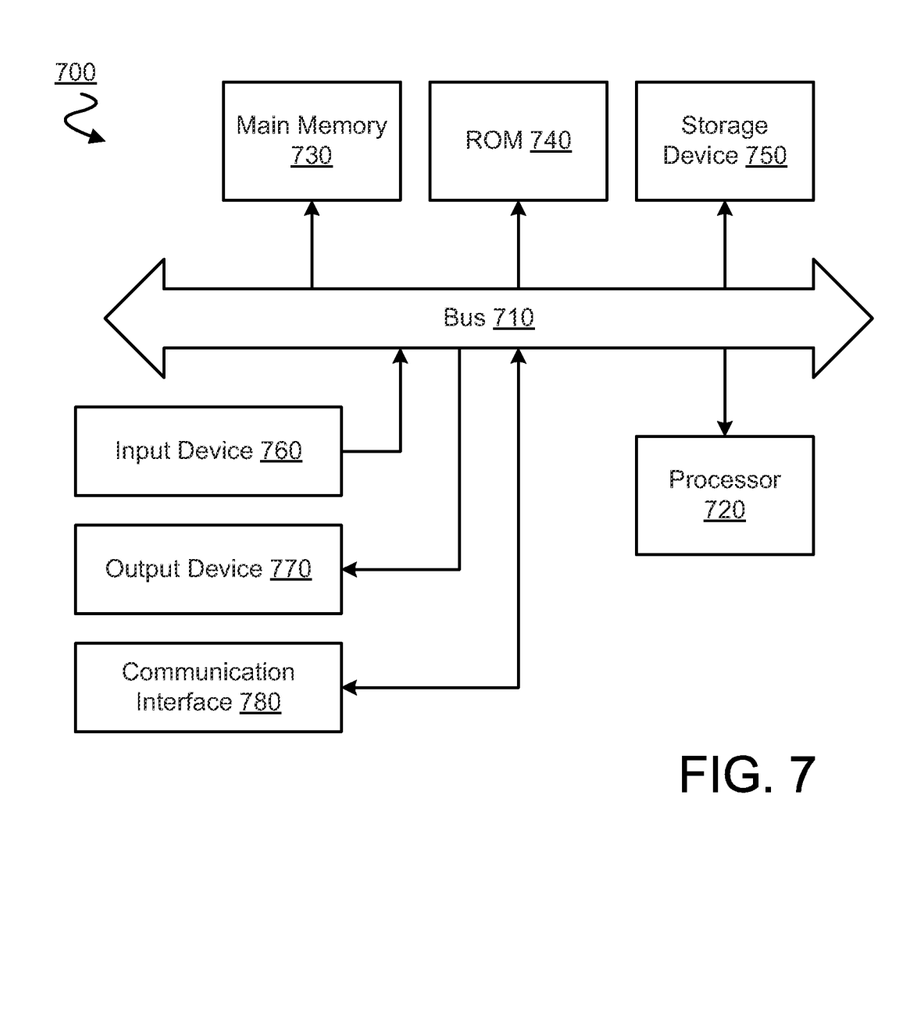
FIG. 7 is a block diagram illustrating example elements of a computer device for determining of a data traffic congestion state according to an embodiment.

FIG. 7 illustrates an exemplary computer device 700 for evaluating congestion state according to an embodiment. The computer device 700 may include a bus 710, a processor 720, a main memory 730, a read only memory (ROM) 740, a storage device 750, an input device 760, an output device 770, and a communication interface 780. The bus 710 may include one or more conventional buses that permit communication among the components of the computer device 700.

The processor 720 may include any type of conventional processor or microprocessor that interprets and executes instructions. The main memory 730 may include a random access memory (RAM) or another type of dynamic storage device that stores information and instructions for execution by the processor 720. The ROM 740 may include a conventional ROM device or another type of static storage device that stores static information and instructions for use by the processor 720. The storage device 750 may include a magnetic and/or optical recording medium and its corresponding drive.

The input device 760 may include one or more conventional mechanisms that permit a user to input information to the computer device 700, such as a keyboard, a mouse, a pen, voice recognition and/or biometric mechanisms, etc. The output device 770 may include one or more conventional mechanisms that output information to the user, including a display, a printer, a speaker, etc. The communication interface 780 may include any transceiver-like mechanism that enables the computer device 700 to communicate with other devices and/or systems. For example, the communication interface 780 may include mechanisms for communicating with another device or system via a network, such as network 100.

As described in detail herein, a device such as computer device 700 may, in an embodiment perform certain congestion state evaluation operations. Computer device 700 may, for example, perform such operations in response to processor 720 executing software instructions contained in a computer-readable storage medium, such as memory 730. A computer-readable storage medium may include, for example, one or more volatile and/or non-volatile memory devices.

The software instructions may be read into memory 730 from another computer-readable medium, such as the data storage device 750, or from another device via the communication interface 780. The software instructions contained in memory 730 causes processor 720 to perform congestion evaluation operations described herein. Alternatively, hardwired circuitry may be used in place of or in combination with software instructions to implement processes consistent with certain embodiments. Thus, certain embodiments are not limited to any specific combination of hardware circuitry and software.

Techniques and architectures for determining a data traffic congestion state are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method performed by a source agent of a computer device, the method comprising:
    transmitting, by the computer device, a plurality of packets as a transmission group to a destination for the transmission group, where a size of the transmission group is defined by a congestion window parameter having a first value, the transmission group including at least two packets;
    receiving, by the computer device, from the destination, an acknowledge message associated with a number of packets of the transmission group, wherein the acknowledge message is associated with more than one packet in the transmission group and less than all packets sent in the transmission group;
    identifying, in the acknowledge message, an explicit indicator that the associated packets of the transmission group experienced data traffic congestion;
    determining a number of packets of the transmission group that have experienced data traffic congestion based on explicit indicators identified in respective acknowledge messages;
    performing an evaluation based on a comparison of the determined number of packets to a threshold number of packets;
    determining a congestion state based on the evaluation;
    prior to receiving any subsequent acknowledge messages associated with other packets of the transmission group, changing the congestion window parameter from the first value to a second value based on the determined congestion state; and
    transmitting, by the computer device, at least one additional packet of the transmission group with the congestion window parameter having the second value.

2. The method of claim 1, the congestion window parameter indicating a threshold number of transmitted packets that are pending in a network at a given time.

3. The method of claim 1, wherein the transmission group is a first transmission group, the method further comprising:
    transmitting packets of a second transmission group subsequent to the first transmission group, the second transmission group size is based on the congestion window parameter having the second value, prior to receiving respective transmission outcome indicia for each packet of the first transmission group.

4. The method of claim 1, wherein the transmission group is a first transmission group, the method further comprising:
    initiating a sending of packets of a second transmission group subsequent to the first transmission group, based on the congestion window parameter having the second value;
    detecting a transmission outcome indicium associated with a second packet of the first transmission group;
    performing an evaluation of the transmission outcome indicium associated with the second packet of the first transmission group to determine a second congestion state; and
    based on the determining the second congestion state, generating a signal indicating that the congestion window parameter is to be changed from the second value to a third value, wherein, after the initiating the sending of packets of the second transmission group, the sending of packets of the second transmission group is modified based on the congestion window parameter having the third value.

5. The method of claim 1, further comprising changing a packet transmission rate.

6. The method of claim 1, further comprising:
    detecting second congestion information from a second acknowledge message associated with a second packet;
    performing a second evaluation to determine a second congestion state, the second evaluation based on the second congestion information; and
    modifying a congestion mitigation measure based on the second evaluation.

7. The method of claim 1, wherein the performing the evaluation is prior to any determination of a failure to receive, by the computer device, an acknowledge message associated with another packet transmitted in the transmission group.

8. The method of claim 1, wherein the evaluation is based on at least one of the following:
- a threshold number of packets of the transmission group which have been identified as being associated with data traffic congestion; and
- a threshold rate of change of a number of packets of the transmission group which have been identified as being associated with data traffic congestion.

9. A computer device comprising:
- a transmission outcome repository to store congestion information;
- a communication interface configured to:
  - transmit a plurality of packets as a transmission group to a destination for the transmission group, where a size of the transmission group is defined by a congestion window parameter having a first value, the transmission group including at least two packets, and
  - receive, from the destination, an acknowledge message associated with a number of packets of the transmission group, wherein the acknowledge message is associated with more than one packet in the transmission group and less than all packets sent in the transmission group;
- congestion evaluation logic coupled to the transmission outcome repository configured to:
  - identify, in the acknowledge message, an explicit indicator that the associated packets of the transmission group experienced data traffic congestion;
  - determine a number of packets of the transmission group that have experienced data traffic congestion based on explicit indicators identified in respective acknowledge messages, and
  - perform an evaluation based on a comparison of the determined number of packets to a threshold number of packets;
- the congestion evaluation logic further configured to determine a congestion state based on the evaluation; and
- congestion response logic, wherein the congestion evaluation logic is configured to send a signal to the congestion response logic prior to receiving any subsequent acknowledge messages associated with other packets of the transmission group, the congestion response logic configured to change, responsive to the signal, the congestion window parameter from the first value to a second value based on the determined congestion state, after which the communication interface transmits at least one additional packet of the transmission group with the congestion window parameter having the second value.

10. The computer device of claim 9, wherein:
the transmission group is a first transmission group, and
the congestion response logic is further configured to transmit packets of a second transmission group subsequent to the first transmission group, the second transmission group size is based on the congestion window parameter having the second value, prior to the communication interface receiving respective transmission outcome indicium for each packet of the first transmission group.

11. The computer device of claim 10, wherein the transmission group is a first transmission group and wherein:
the congestion response logic is further configured to initiate a sending of packets of the second transmission group subsequent to the first transmission group based on the congestion window parameter having the second value;
the congestion evaluation logic is further configured to detect the transmission outcome indicium associated with a second packet of the first transmission group;
the congestion evaluation logic is further configured to perform an evaluation of the transmission outcome indicium associated with the second packet of the first transmission group to determine a second congestion state;
based on the determining the second congestion state, the congestion evaluation logic is further configured to signal that the congestion window parameter is to be changed from the second value to a third value; and
wherein after the initiating the sending of packets of the second transmission group, the congestion response logic is further configured to modify the sending of packets of the second transmission group based on the congestion window parameter having the third value.

12. The computer device of claim 9, wherein the congestion evaluation logic is further configured to detect second congestion information from a second acknowledge message associated with a second packet, and the congestion evaluation logic further to perform a second evaluation to determine a second congestion state, the second evaluation based on the second congestion information.

13. The computer device of claim 12, wherein the congestion response logic is further configured to modify a congestion mitigation measure based on the second evaluation.

14. The computer device of claim 9, wherein the congestion evaluation logic is configured to perform the evaluation based on at least one of the following:
- a threshold number of packets of the transmission group which have been identified as being associated with data traffic congestion; and
- a threshold rate of change of a number of packets of the transmission group which have been identified as being associated with data traffic congestion.

15. A non-transitory computer-readable storage medium having stored thereon instructions which, when executed by one or more processing units, cause the one or more processing units to:
- transmit a plurality of packets as a transmission group to a destination for the transmission group, where a size of the transmission group is defined by a congestion window parameter having a first value, the transmission group including at least two packets;
- receive, from the destination, an acknowledge message associated with a number of packets of the transmission group, wherein the acknowledge message is associated with more than one packet in the transmission group and less than all packets sent in the transmission group;
- identify, in the acknowledge message, an explicit indicator that the associated packets of the transmission group experienced data traffic congestion;
- determine a number of packets of the transmission group that have experienced data traffic congestion based on explicit indicators identified in respective acknowledge messages;
- perform an evaluation based on a comparison of the determined number of packets to a threshold number of packets;
- determine a congestion state based on the evaluation;
- change, prior to receiving any subsequent acknowledge messages associated with other packets of the transmission group, the congestion window parameter from the first value to a second value based on the determined congestion state; and transmit at least one additional packet of the transmission group with the congestion window parameter having the second value.

16. The computer-readable storage medium of claim 15, the congestion window parameter indicating a threshold number of transmitted packets to be pending in a network at a given time.

17. The computer-readable storage medium of claim 15, wherein the transmission group is a first transmission group, and the instructions further cause the one or more processing units to:

transmit packets of a second transmission group subsequent to the first transmission group, the second transmission group sized based on the congestion window parameter having the second value, prior to receiving respective transmission outcome indicia for each packet of the first transmission group.

18. The computer-readable storage medium of claim 15, wherein the transmission group is a first transmission group, and the instructions further cause the one or more processing units to:

initiate sending of packets of a second transmission group subsequent to the first transmission group based on the congestion window parameter having the second value;

detect the transmission outcome indicium associated with a second packet of the first transmission group;

perform an evaluation of a transmission outcome indicium associated with the second packet of the first transmission group to determine a second congestion state;

change, based on the second congestion state, the congestion window parameter from the second value to a third value after initiating the sending of packets of the second transmission group; and modify the sending of packets of the second transmission group based on the congestion window parameter having the third value.

19. The computer-readable storage medium of claim 15, wherein the instructions further cause the one or more processing units to change a packet transmission rate.

20. The computer-readable storage medium of claim 15, wherein the instructions further cause the one or more processing units to:

detect second congestion information from a second acknowledge message associated with a second packet;

perform a second evaluation to determine a second congestion state, the second evaluation based on the second congestion information; and modify a congestion mitigation measure based on the second evaluation.

21. The computer-readable storage medium of claim 15, wherein the performing the evaluation is prior to any determination of a failure to acknowledge the second packet.

22. The computer-readable storage medium of claim 15, wherein the evaluation is based on at least one of the following:

a threshold number of packets of the transmission group which have been identified as being associated with data traffic congestion; and a threshold rate of change of a number of packets of the transmission group which have been identified as being associated with data traffic congestion.

* * * * *